United States Patent [19]
Green

[11] Patent Number: 6,053,793
[45] Date of Patent: Apr. 25, 2000

[54] GAME CALL BLOWING DEVICE

[76] Inventor: Billy Green, 391 S. Oakridge Dr., Cleveland, Tex. 77327

[21] Appl. No.: 09/244,397

[22] Filed: Feb. 4, 1999

[51] Int. Cl.⁷ ..................................................... A63H 5/00
[52] U.S. Cl. .......................... 446/192; 446/188; 446/213; 446/397
[58] Field of Search ................................... 446/180, 188, 446/192, 196, 213, 216, 397, 195

[56] References Cited

U.S. PATENT DOCUMENTS

| | | |
|---|---|---|
| 2,116,183 | 5/1938 | Beach et al. . |
| 2,393,445 | 1/1946 | Zimmerman ............................ 446/192 |
| 4,862,625 | 9/1989 | Dolan ..................................... 446/397 |
| 5,402,102 | 3/1995 | Lachance ............................... 446/397 |
| 5,555,664 | 9/1996 | Shockley ................................ 446/397 |
| 5,613,891 | 3/1997 | Lamo ..................................... 446/188 |

FOREIGN PATENT DOCUMENTS 633641  12/1949  United Kingdom ................... 446/216

Primary Examiner—Robert A. Hafer
Assistant Examiner—Jeffrey D. Carlson

[57] ABSTRACT

A game call blowing device for blowing air through a forced air game call remote from a user. The game call blowing device includes a support frame with elongate upper and lower arms. The upper arm of the support frame has a bore therethrough. A tube with open first and second ends is extended through the bore of the upper arm of the support frame. The first end of the tube is inserted into a hole in the top face of a canister. The first end of the tube has an annular disk outwardly radiating therefrom in the canister. One end of an elongate flexible cord is coupled to the top face of the canister. The second end of the tube is designed for attaching a blowing end of a forced air game call to fluidly connect the tube to the forced air game call.

14 Claims, 2 Drawing Sheets

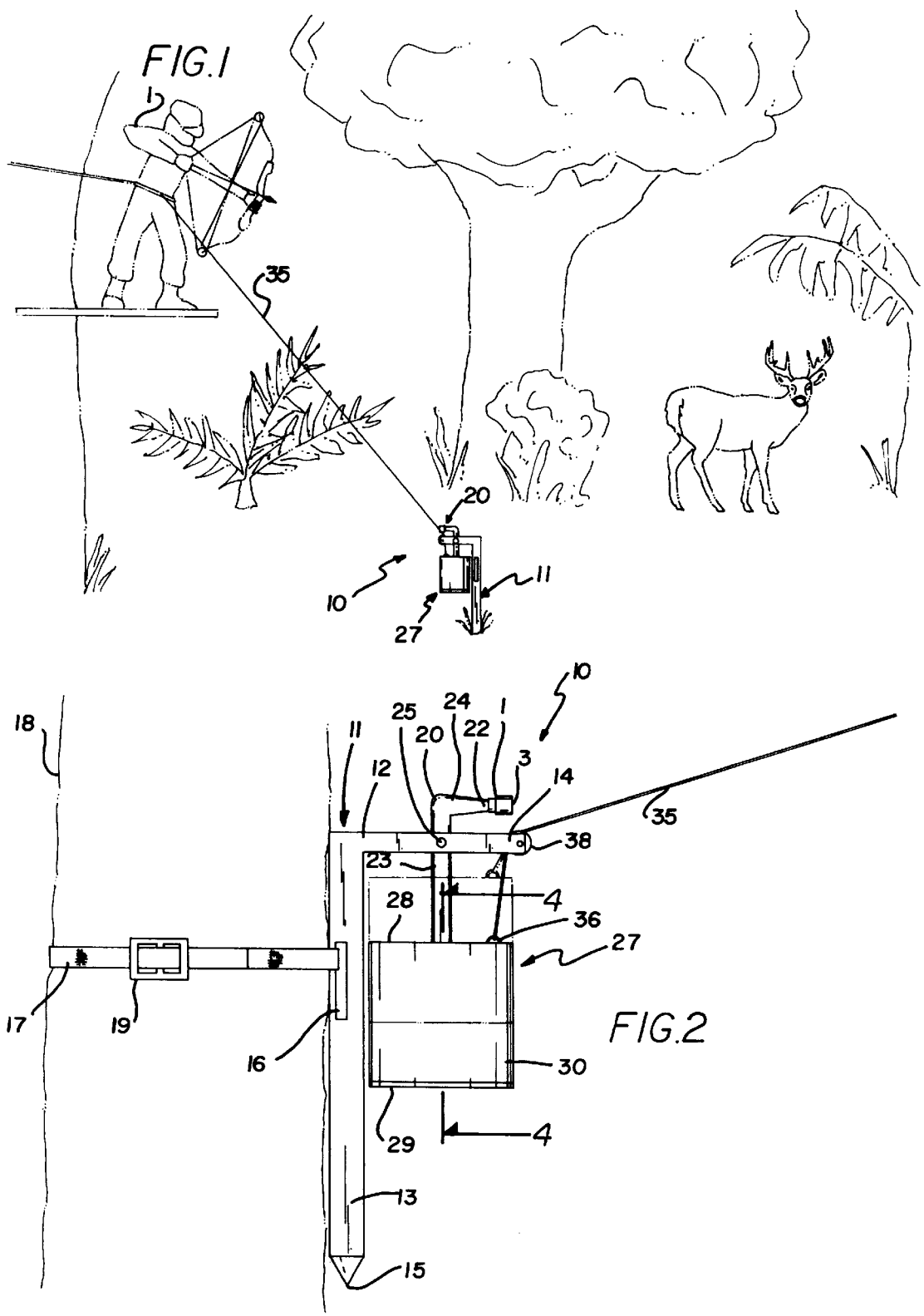

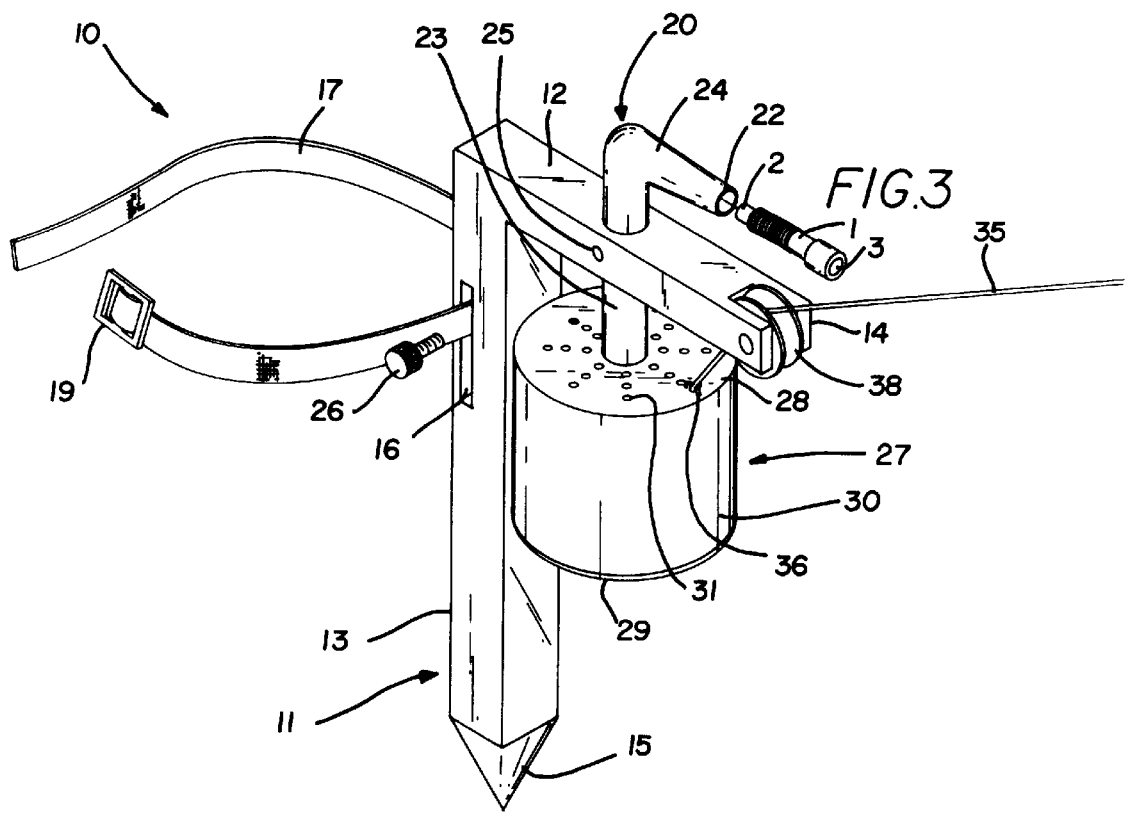
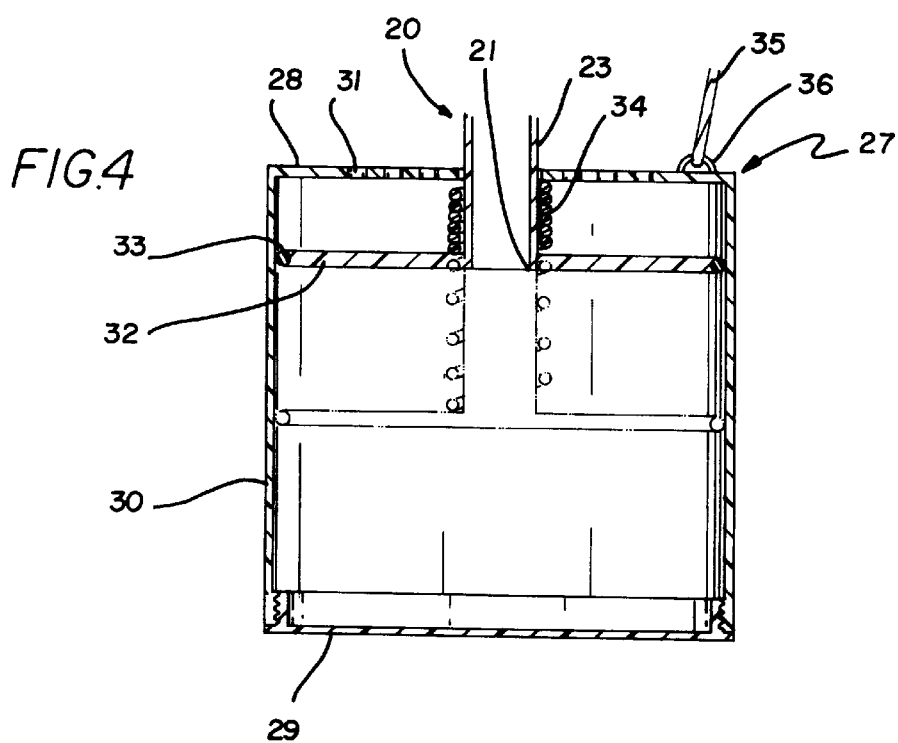

GAME CALL BLOWING DEVICE

BACKGROUND OF THE INVENTION

1. Field of the Invention

The present invention relates to devices for blowing game calls and more particularly pertains to a new game call blowing device for blowing air through a forced air game call remote from a user.

2. Description of the Prior Art

The use of devices for blowing game calls is known in the prior art. More specifically, devices for blowing game calls heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,613,891; U.S. Pat. No. 3,968,592; U.S. Pat. No. 5,572,592; U.S. Pat. No. 5,549,498; U.S. Pat. No. 2,116,183; and U.S. Pat. No. Des. 247,785.

While these devices fulfill their respective, particular objectives and requirements, the aforementioned patents do not disclose a new game call blowing device. The inventive device includes a support frame with elongate upper and lower arms. The upper arm of the support frame has a bore therethrough. A tube with open first and second ends is extended through the bore of the upper arm of the support frame. The first end of the tube is inserted into a hole in the top face of a canister. The first end of the tube has an annular disk outwardly radiating therefrom in the canister. One end of an elongate flexible cord is coupled to the top face of the canister. The second end of the tube is designed for attaching a blowing end of a forced air game call to fluidly connect the tube to the forced air game call.

In these respects, the game call blowing device according to the present invention substantially departs from the conventional concepts and designs of the prior art, and in so doing provides an apparatus primarily developed for the purpose of blowing air through a forced air game call remote from a user.

SUMMARY OF THE INVENTION

In view of the foregoing disadvantages inherent in the known types of devices for blowing game calls now present in the prior art, the present invention provides a new game call blowing device construction wherein the same can be utilized for blowing air through a forced air game call remote from a user.

The general purpose of the present invention, which will be described subsequently in greater detail, is to provide a new game call blowing device apparatus and method which has many of the advantages of the devices for blowing game calls mentioned heretofore and many novel features that result in a new game call blowing device which is not anticipated, rendered obvious, suggested, or even implied by any of the prior art devices for blowing game calls, either alone or in any combination thereof.

To attain this, the present invention generally comprises a support frame with elongate upper and lower arms. The upper arm of the support frame has a bore therethrough. A tube with open first and second ends is extended through the bore of the upper arm of the support frame. The first end of the tube is inserted into a hole in the top face of a canister. The first end of the tube has an annular disk outwardly radiating therefrom in the canister. One end of an elongate flexible cord is coupled to the top face of the canister. The second end of the tube is designed for attaching a blowing end of a forced air game call to fluidly connect the tube to the forced air game call.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new game call blowing device apparatus and method which has many of the advantages of the devices for blowing game calls mentioned heretofore and many novel features that result in a new game call blowing device which is not anticipated, rendered obvious, suggested, or even implied by any of the prior art devices for blowing game calls, either alone or in any combination thereof.

It is another object of the present invention to provide a new game call blowing device which may be easily and efficiently manufactured and marketed.

It is a further object of the present invention to provide a new game call blowing device which is of a durable and reliable construction.

An even further object of the present invention is to provide a new game call blowing device which is susceptible of a low cost of manufacture with regard to both materials and labor, and which accordingly is then susceptible of low prices of sale to the consuming public, thereby making such game call blowing device economically available to the buying public.

Still yet another object of the present invention is to provide a new game call blowing device which provides in the apparatuses and methods of the prior art some of the advantages thereof, while simultaneously overcoming some of the disadvantages normally associated therewith.

Still another object of the present invention is to provide a new game call blowing device for blowing air through a forced air game call remote from a user.

Yet another object of the present invention is to provide a new game call blowing device which includes a support frame with elongate upper and lower arms. The upper arm of the support frame has a bore therethrough. A tube with open first and second ends is extended through the bore of the upper arm of the support frame. The first end of the tube is inserted into a hole in the top face of a canister. The first end of the tube has an annular disk outwardly radiating therefrom in the canister. One end of an elongate flexible cord is coupled to the top face of the canister. The second end of the tube is designed for attaching a blowing end of a forced air game call to fluidly connect the tube to the forced air game call.

Still yet another object of the present invention is to provide a new game call blowing device that lets a user control the length of time a remote game call is blown to emit a sound to attract game to the game call and the user.

Even still another object of the present invention is to provide a new game call blowing device that lets a hunter in a tree stand blow a game call on the ground to more accurately simulate the location of the call of the game being attracted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new game call blowing device in use according to the present invention.

FIG. 2 is a schematic side view of the present invention attached to a tree trunk.

FIG. 3 is a schematic perspective view of the present invention.

FIG. 4 is a schematic cross sectional view illustrating the interior of the canister of the present invention.

DESCRIPTION OF THE PREFERRED EMBODIMENT

With reference now to the drawings, and in particular to FIGS. 1 through 4 thereof, a new game call blowing device embodying the principles and concepts of the present invention and generally designated by the reference numeral 10 will be described.

The game call blowing device 10 is designed for blowing air through a forced air game call 1 having a blowing end 2 into which air is blown into the game call and a discharge end 3 from which the sound of the game call is emitted. As best illustrated in FIGS. 1 through 4, the game call blowing device 10 generally comprises a support frame 11 with elongate upper and lower arms 12,13. The upper arm of the support frame has a bore therethrough. A tube 20 with open first and second ends 21,22 is extended through the bore of the upper arm of the support frame. The first end of the tube is inserted into a hole in the top face 28 of a canister 27. The first end of the tube has an annular disk 32 outwardly radiating therefrom in the canister. One end of an elongate flexible cord 35 is coupled to the top face of the canister. The second end of the tube is designed for attaching a blowing end of a forced air game call to fluidly connect the tube to the forced air game call.

In closer detail, the generally inverted L-shaped support frame 11 has an elongate upper arm 12 and an elongate lower arm 13 downwardly depending from the upper arm of the support frame. The upper and lower arm of the support frame each have a longitudinal axis. The longitudinal axes of the upper and lower arms are preferably extended generally perpendicular to one another. In a preferred embodiment, the upper and lower arms of the support frame each have a generally rectangular transverse cross section generally perpendicular to the longitudinal axis of the respective arm of the support frame.

The upper arm of the support frame terminates at a distal end 14. The lower arm of the support frame terminates at a lower end 15. As illustrated in FIG. 1, in use, the lower end of the arm portion is designed for inserting into a ground surface. Preferably, the lower arm of the support frame tapers to a point at the lower end of the support frame for aiding insertion of the lower end of the lower arm into the ground surface.

The support frame has a height defined along the lower arm between the upper arm and the lower end of the lower arm and a length defined along the upper arm between the lower arm and the distal end of the upper arm. In an ideal illustrative embodiment, the height of the support frame is about 12 inches and the length of the support frame is about 6 inches.

Preferably, the lower arm of the support frame has a generally rectangular lateral slot 16 therethrough extending transversely across the longitudinal axis of the lower arm. An elongate flexible strap 17 is extended through the lateral slot of the lower arm. The flexible strap has a pair of opposite ends. As illustrated in FIG. 2, in use, the flexible strap is designed for wrapping around a tree trunk or post to hang the support frame from the tree trunk or post. Ideally, the flexible strap has a buckle 19 detachably attaching the ends of the flexible strap together. Optionally, a threaded fastener 26 may be threadably extended into the lateral slot adjacent the flexible strap to releasably hold the flexible strap in a fixed position along the height of the lateral slot.

The upper arm of the support frame has a generally circular bore therethrough. The bore of the upper arm is located on the upper arm between the lower arm and the distal end of the upper arm and has a longitudinal axis extending generally parallel to the longitudinal axis of the lower arm.

The tube 20 has a lumen and open first and second ends 21,22 into the lumen of the tube. The tube is preferably a generally inverted L-shape and has elongate first and second portions 23,24. The first portion of the tube is positioned adjacent the first end of the tube. The second portion of the tube is positioned adjacent the second end of the tube. The first and second portions of the tube preferably have longitudinal axes extending generally perpendicular to one another. The first and second portions of the tube each ideally have a generally circular transverse cross section taken substantially perpendicular to the longitudinal axis of the respective portion of the tube.

The first portion of the tube is extended through the bore of the upper arm of the support frame. The first end of the tube is downwardly extended from the upper arm of the support frame and the second portion of the tube is positioned above the upper arm of the support frame and the second end of the tube is extended towards the distal end of the upper arm. The longitudinal axes of the first portion of the tube and the lower arm of the support frame are preferably extended generally parallel to one another. Similarly, the longitudinal axes of the second portion of the tube and the upper arm of the support frame are preferably extended generally parallel to one another.

Preferably, the tube is coupled to the upper arm. Ideally, this is accomplished by a set screw 25 threadably extended transversely through the upper arm into the bore of the upper arm. The set screw releasably holds the first portion of the tube in a fixed position with respect to the upper arm. This permits a user to adjust the height at which the second portion of the tube is spaced above the upper arm.

With particular reference to FIG. 4, the generally cylindrical canister 27 has generally circular top and bottom faces 28,29, and a generally cylindrical perimeter side wall 30 between the top and bottom faces of the canister. The canister has a longitudinal axis extending between the top and bottom faces of the canister. Preferably, the top and bottom faces of the canister lie in generally parallel planes to one another generally perpendicular to the longitudinal axis of the canister. Ideally, the bottom face of the canister is threadably attached to the perimeter side wall of the canister to permit detachment of the bottom face of the canister from the perimeter side wall of the canister to provide access to the interior of the canister.

The top face of the canister has a generally circular hole therethrough. The hole of the top face of the canister is preferably centrally position on the top face of the canister. The first end of the tube is inserted into the canister through the hole of the top face of the canister. This relationship allows the top face of the canister top slide up and down on the first portion of the tube along the longitudinal axis of first portion of the tube to permit positioning of the first end of the tube closer and further away from the bottom face of the canister. Preferably, the top face of the canister has a plurality of spaced apart generally circular apertures 31 therethrough to permit passage of air into the canister. The apertures of the top face of the canister are ideally arranged in a plurality of rows outwardly radiating from the hole of the top face of the canister.

The first end of the tube has an annular disk 32 or flange outwardly radiating therefrom. The annular disk of first end of the tube is disposed in the canister. The annular disk of the first end of the tube has a generally circular outer perimeter to conform to the shape of the perimeter side wall of the canister. Preferably, the annular disk lies in a plane extending substantially perpendicular to the longitudinal axis of the first portion of the tube. Even more preferably, the annular disk and the top and bottom faces of the canister lie in generally parallel planes to one another.

Preferably, the annular disk has an annular gasket 33 extending around the outer perimeter of the annular disk. The annular gasket abuts the perimeter side wall around the outer perimeter of the annular disk. The annular gasket preferably has a generally circular transverse cross section and comprises a resiliently deformable material such as a resiliently deformable rubber.

A tension spring 34 is preferably disposed around the first portion of the tube in the canister. The tension spring is coupled to the top face of the canister and the annular disk. The tension spring biases the top face of the canister and the annular disk towards each other.

The elongate flexible cord 35 has a pair of opposite ends. One end of the flexible cord is coupled to a securing ring 36 on the top face of the canister. The other end of the flexible cord may be grasped by the hand of the user or, as illustrated in FIG. 1, secured to the clothing of the user 37 such as to the belt of the user. In use, this other end of the flexible cord is designed for pulling by a user to pull the canister along the first portion of the tube towards the second portion of the tube. This moves the annular disk towards the bottom face of the canister thereby forcing air in the canister between the annular disk and the bottom face of the canister into the tube from the first end of the tube and out of the tube through the second end of the tube.

Preferably, a pulley 38 is rotatably mounted to the distal end of the upper arm of the frame. The flexible cord is looped around the pulley. In use, the pulley is designed for aiding smooth pulling of the canister by the flexible cord.

The second end of the tube is designed for attaching thereto a blowing end 2 of a forced air game call 1 to fluidly connect the tube to the forced air game call. Preferably, the blowing end 2 of the forced air game call is inserted into the second end of tube. Ideally, the second portion of the tube tapers towards the second end of the tube. This permits insertion of the second end of the tube into blowing ends of game calls larger than can be inserted into the second end of the tube.

In use, air forced into the tube from the canister is forced out the second end of the tube and through the forced air game call so that the forced air game call emits its sound to attract game.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for blowing air through a forced air game call, said device comprising:

a support frame having elongate upper and lower arms;

said upper and lower arm of said support frame each having a longitudinal axis;

said upper arm of said support frame terminating at a distal end;

said lower arm of said support frame terminating at a lower end;

said upper arm of said support frame having a bore therethrough;

a tube having a lumen and open first and second ends into said lumen of said tube;

said tube being extended through said bore of said upper arm of said support frame;

a canister having top and bottom faces, a perimeter side wall between said top and bottom faces of said canister, and a longitudinal axis extending between said top and bottom faces of said canister;

said top face of said canister having a hole therethrough;

said first end of said tube being inserted into said canister through said hole of said top face of said canister;

said first end of said tube having an annular disk outwardly radiating therefrom;

said annular disk of first end of said tube being disposed in said canister, said annular disk of said first end of said tube having an outer perimeter;

an elongate flexible cord having a pair of opposite ends, one end of said flexible cord being coupled to said top face of said canister; and said second end of said tube being adapted for attaching thereto a blowing end of a forced air game call to fluidly connect said tube to the forced air game call.

2. The device of claim 1, wherein said longitudinal axes of said upper and lower arms are extended generally perpendicular to one another.

3. The device of claim 2, wherein said upper and lower arms of said support frame each have a generally rectangular transverse cross section generally perpendicular to the longitudinal axis of the respective arm of said support frame.

4. The device of claim 1, wherein said lower arm of said support frame tapers to a point at said lower end of said support frame.

5. The device of claim 1, further comprising an elongate flexible strap, wherein said lower arm of said support frame has a lateral slot therethrough, wherein said elongate flexible strap is extended through said lateral slot of said lower arm.

6. The device of claim 5, wherein said flexible strap has a pair of opposite ends, and wherein said flexible strap has a buckle detachably attaching said ends of said flexible strap together.

7. The device of claim 1, wherein said tube is generally inverted L-shaped and has elongate first and second portions, said first portion of said tube being positioned adjacent said first end of said tube, said second portion of said tube being positioned adjacent said second end of said tube.

8. The device of claim 1, wherein said bottom face of said canister is threadably attached to said perimeter side wall of said canister.

9. The device of claim 1, wherein said top face of said canister has a plurality of generally circular apertures therethrough to permit passage of air into said canister.

10. The device of claim 9, wherein said apertures of said top face of said canister are arranged in a plurality of rows outwardly radiating from said hole of said top face of said canister.

11. The device of claim 1, wherein said annular disk has an annular gasket extending around said outer perimeter of said annular disk, said annular gasket abutting said perimeter side wall around said outer perimeter of said annular disk.

12. The device of claim 1, further comprising a tension spring being disposed around said tube in said canister, said tension spring being coupled to said top face of said canister and said annular disk, said tension spring biasing said top face of said canister and said annular disk towards each other.

13. The device of claim 1, further comprising a pulley being rotatably mounted to said distal end of said upper arm of said frame, said flexible cord being looped around said pulley.

14. A device for blowing air through a forced air game call having a blowing end into which air is blown into the game call and a discharge end from which the sound of the game call is emitted, said device comprising:

a generally inverted L-shaped support frame having elongate upper and lower arm;

said upper and lower arm of said support frame each having a longitudinal axis;

said longitudinal axes of said upper and lower arms being extended generally perpendicular to one another;

said upper and lower arms of said support frame each having a generally rectangular transverse cross section generally perpendicular to the longitudinal axis of the respective arm of said support frame;

said upper arm of said support frame terminating at a distal end;

said lower arm of said support frame terminating at a lower end;

said lower arm of said support frame tapering to a point at said lower end of said support frame;

said lower arm of said support frame having a generally rectangular lateral slot therethrough;

an elongate flexible strap being extended through said lateral slot of said lower arm, said flexible strap having a pair of opposite ends;

said flexible strap having a buckle detachably attaching said ends of said flexible strap together;

said upper arm of said support frame having a generally circular bore therethrough, said bore of said upper arm being located on said upper arm between said lower arm and said distal end of said upper arm;

said bore of said upper arm having a longitudinal axis extending generally parallel to said longitudinal axis of said lower arm;

a tube having a lumen and open first and second ends into said lumen of said tube;

said tube being generally inverted L-shaped and having elongate first and second portions, said first portion of said tube being positioned adjacent said first end of said tube, said second portion of said tube being positioned adjacent said second end of said tube;

said first and second portions of said tube having longitudinal axes extending generally perpendicular to one another;

said first and second portions of said tube each having a generally circular transverse cross section substantially perpendicular to the longitudinal axis of the respective portion of said tube;

said first portion of said tube being extended through said bore of said upper arm of said support frame such that said first end of said tube is downwardly extends from said upper arm of said support frame and said second portion of said tube is positioned above said upper arm of said support frame;

said longitudinal axes of said first portion of said tube and said lower arm of said support frame being extended generally parallel to one another;

said longitudinal axes of said second portion of said tube and said upper arm of said support frame being extended generally parallel to one another;

a generally cylindrical canister having generally circular top and bottom faces, a generally cylindrical perimeter side wall between said top and bottom faces of said canister, and a longitudinal axis extending between said top and bottom faces of said canister;

said top and bottom faces of said canister lying in generally parallel planes to one another generally perpendicular to said longitudinal axis of said canister;

said bottom face of said canister being threadably attached to said perimeter side wall of said canister;

said top face of said canister having a generally circular hole therethrough, said hole of said top face of said canister being centrally position on said top face of said canister;

said first end of said tube being inserted into said canister through said hole of said top face of said canister;

said top face of said canister having a plurality of generally circular apertures therethrough to permit passage of air into said canister;

said apertures of said top face of said canister being arranged in a plurality of rows outwardly radiating from said hole of said top face of said canister;

said first end of said tube having an annular disk outwardly radiating therefrom;

said annular disk of first end of said tube being disposed in said canister, said annular disk of said first end of said tube having a generally circular outer perimeter;

said annular disk lying in a plane extending substantially perpendicular to said longitudinal axis of said first portion of said tube;

said annular disk and said top and bottom faces of said canister lying in generally parallel planes to one another;

said annular disk having an annular gasket extending around said outer perimeter of said annular disk, said annular gasket abutting said perimeter side wall around said outer perimeter of said annular disk;

a tension spring being disposed around said first portion of said tube in said canister, said tension spring being coupled to said top face of said canister and said annular disk, said tension spring biasing said top face of said canister and said annular disk towards each other;

an elongate flexible cord having a pair of opposite ends, one end of said flexible cord being coupled to said top face of said canister;

a pulley being rotatably mounted to said distal end of said upper arm of said frame, said flexible cord being looped around said pulley;

said second end of said tube being adapted for attaching thereto a blowing end of a forced air game call to fluidly connect said tube to the forced air game call; and said second portion of said tube tapering towards said second end of said tube.

\* \* \* \* \*